(12) United States Patent
Yu (10) Patent No.: US 10,777,995 B1
(45) Date of Patent: Sep. 15, 2020

(54) SAFETY DEVICE FOR SWITCH

(71) Applicant: Tsung-Mou Yu, New Taipei (TW)

(72) Inventor: Tsung-Mou Yu, New Taipei (TW)

( * ) Notice: Subject to any disclaimer, the term of this patent is extended or adjusted under 35 U.S.C. 154(b) by 0 days.

(21) Appl. No.: 16/533,321

(22) Filed: Aug. 6, 2019

(51) Int. Cl.
*H02H 3/08* (2006.01)
*G01K 5/64* (2006.01)

(52) U.S. Cl.
CPC .................. *H02H 3/08* (2013.01); *G01K 5/64* (2013.01)

(58) Field of Classification Search
CPC .................................. H02H 3/08; G01K 5/64
USPC .............................................. 361/24; 337/66
See application file for complete search history.

(56) References Cited

U.S. PATENT DOCUMENTS 6,366,434 B2 * 4/2002 Magnussen .......... H01H 47/004
361/55

* cited by examiner

*Primary Examiner* — David Luo
(74) *Attorney, Agent, or Firm* — Wang Law Firm, Inc.

(57) ABSTRACT

A safety device for a switch includes a casing, a top cover, a conductive plate, a first terminal, a second terminal, a pushing member and a connection member. The first terminal has a first end in connection with a fixed end of the conductive plate. The second terminal has a first end with a second contact point corresponding to a first contact point on a free end of the conductive plate. The pushing member is disposed between the first terminal and the second terminal. A gap is defined between the pushing member and the conductive plate. The connection member is in connection with the top cover and the free end of the conductive plate. Therefore, the pushing member can effectively push and force the deformed conductive plate after overheating to trip off completely, so that a circuit is cut off, thereby achieving the purpose of protection of the switch.

8 Claims, 8 Drawing Sheets

SAFETY DEVICE FOR SWITCH

BACKGROUND OF THE INVENTION

1. Field of the Invention

The present invention relates generally to a safety device for a switch, and more particularly, to provide a pushing member effectively pushing and forcing a deformed conductive plate after overheating to trip off completely, so that a circuit is cut off.

2. The Prior Arts

A conventional safety device for a switch is used to electrically connect the two terminals when the circuit is in "ON" status and electrically separate the two terminals when the circuit is in "OFF" status.

Figure 1:
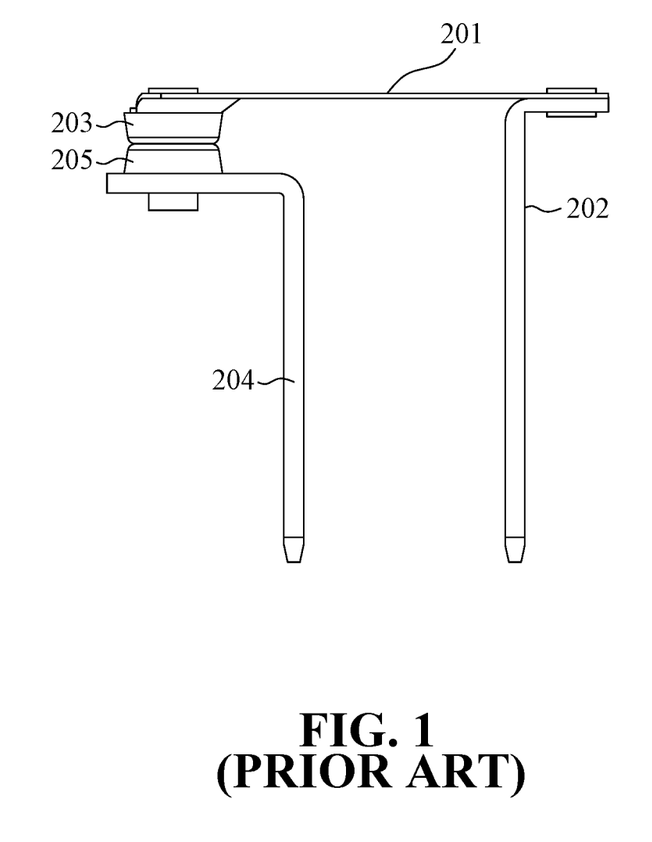
FIG. 1 is a schematic diagram illustrating a circuit in "ON" status of a conventional safety device for a switch.
Figure 2:
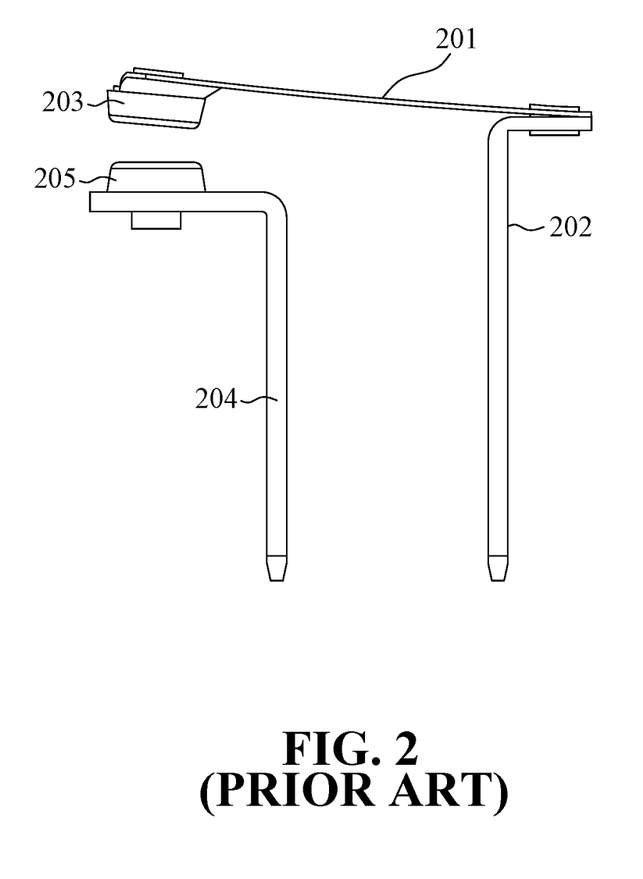
FIG. 2 is a schematic diagram illustrating a circuit in "OFF" status of a conventional safety device for a switch.

FIG. 1 is a schematic diagram illustrating a circuit in "ON" status of a conventional safety device for a switch and FIG. 2 is a schematic diagram illustrating a circuit in "ON" status of a conventional safety device for a switch. As shown in FIGS. 1 and 2, the conventional safety device includes a conductive plate 201, a first terminal 202 and a second terminal 204. The conductive plate 201 has a free end and a fixed end. The free end of the conductive plate 201 has a first contact point 203. The fixed end of the conductive plate is in connection with the first terminal 202. The second terminal 204 includes a second contact point 205. A position of the first contact point 203 corresponds to a position of the second contact point 205. When the first contact point 203 of the conductive plate 201 and the second contact point 205 of the second terminal 204 are in contact with each other, the circuit is in "ON" status, as best shown in FIG. 1. When the first contact point 203 of the conductive plate 201 and the second contact point 205 of the second terminal 204 are separated from each other, the circuit is in "OFF" status, as best shown in FIG. 2.

In other to avoid a circuit from being burnt under a current overload condition, which generates a high heat to burn or melt the circuit or electric fire, the conductive plate 201 is made of alloy and can deform toward an opposite direction under a current overload condition. When the circuit is under a current overload condition and the conductive plate 201 is overheating, the conductive plate 201 is bent and deformed toward an opposite direction and bounces in such a manner that the first contact point 203 of the conductive plate 201 and the second contact point 205 of the second terminal 204 are separated from each other and the circuit is cut off, thereby avoiding an electronic appliance or an electrical appliance from being burnt because of overheating and ensuring security of electricity usage.

However, because the conductive plates 201 may have different thicknesses, widths, lengths, and ingredients of each of the metal materials, when the conventional safety device is manufactured, a manufacturer cannot ensure that the conductive plates 201 have the same thicknesses, curvatures and structure properties, such that a reaction temperature value of the deformed conductive plates 201 do not effectively control after overheating. If an error of the reaction temperature value of the conductive plate 201 is greater, a temperature sensitivity of the conductive plate 201 is reduced. When the circuit is under a current overload condition and the conductive plate 201 is overheating, the conductive plate 201 cannot promptly trip off as expected at a pre-set temperature threshold value, which fails to achieve the purpose of protection of the switch.

If the conductive plate 201 does not trip off completely, the circuit becomes to be connected and cut off frequently alternatively, so that the current supplied to the electronic appliance or the electrical appliance is not stable, the electronic appliance or the electrical appliance are likely to be breakdown or cannot operate normally and the life of the electronic appliance or the electrical appliance is shortened. Moreover, when the circuit becomes to be connected and cutoff frequently alternatively, the circuit easily generates spark, high heat and fire, even fire accident would happen.

As such, a safety device for a switch is desired to be provided for providing a solution in accordance with the foregoing disadvantages of the conventional safety device.

SUMMARY OF THE INVENTION

A primary objective of the present invention is to provide a safety device for a switch, wherein the safety device is provided with a pushing member effectively pushing and forcing a deformed conductive plate after overheating to trip off completely, so that a circuit is cut off.

Another objective of the present invention is to provide a safety device for a switch, wherein the problem that the conductive plate of the conventional safety device does not trip off completely is improved and avoid the circuit connecting and cutting off frequently alternatively, so that the current supplied to an electronic appliance or an electrical appliance is stable and the life of the electronic appliance or the electrical appliance is prolonged.

A further objective of the present invention is to provide a safety device for a switch, wherein the problem that the conductive plate of the conventional safety device does not trip off completely is improved and avoid the circuit connecting and cutting off frequently alternatively, the circuit cannot generate spark, high heat and fire, no fire accident would happen.

A further objective of the present invention is to provide a safety device for a switch, wherein when the conductive plates have different temperature threshold values, they can still promptly trip off as expected to cut off circuits smoothly, thereby achieving the purpose of protection of the switches.

For achieving the foregoing objectives, the present invention provides a safety device for a switch. The safety device includes a casing, a top cover, a conductive plate, at least two terminals, a pushing member, and a connection member.

The casing has an opening.

The top cover is movably disposed at the opening of the casing.

The conductive plate includes a fixed end, a free end, a first side and a second side. The free end of the conductive plate has a first contact point.

The at least two terminals defines a first terminal and a second terminal respectively. The first terminal has a first end and a second end. The first end of the first terminal is in connection with the fixed end of the conductive plate. The second end of the first terminal extends out of the casing and is in connection with a first wire. The second terminal has a first end and a second end. The first end of the second terminal has a second contact point. The second contact point corresponds to the first contact point. The second end of the second terminal extends out of the casing and is in connection with a second wire.

The pushing member is disposed between the first terminal and the second terminal and includes an end portion. A gap is defined between the end portion and the first side of the conductive plate.

The connection member is in connection with the top cover and the free end of the conductive plate.

Wherein when the top cover is pressed down, the connection member pushes the conductive plate to move downward in such a manner that the first contact point and the second contact point are in contact with each other so as to form a circuit.

Wherein when the circuit is under a current overload condition and the conductive plate is overheating, the conductive plate is bent and deformed toward the first side of the conductive plate, and the first side of the conductive plate is in contact with the end portion of the pushing member, thereby forcing the free end of the conductive plate to bounce toward the second side of the conductive plate in such a manner that the first contact point and the second contact point are separated from each other and the circuit is cut off.

According to an embodiment of the present invention, the connection member includes a cam and a guide rod; wherein the cam is pivotally mounted on the casing and has a recess and a hook, the hook hooks the free end of the conductive plate; and wherein the guide rod has a first end and a second end, the first end of the guide rod is rotatably mounted on the top cover, the second end of the guide rod has a pin, and the pin is movably disposed in the recess.

Preferably, the recess includes a first positioning portion and a second positioning portion, a position of the first positioning portion of the recess is close to a top portion of the cam, and a position of the second positioning portion of the recess is close to the hook.

Preferably, the casing further includes a path, the pin penetrates through the recess and is movably disposed in the path.

Preferably, the path includes an upper path and a lower path, a position of the upper path corresponds to the position of the first positioning portion of the recess and a position of the lower path corresponds to the position of the second positioning portion of the recess.

According to an embodiment of the present invention, the first end of the guide rod is formed a ring, the top cover includes a shaft, and the ring of the guide rod is rotatably mounted on the shaft of the top cover.

According to an embodiment of the present invention, the safety device further comprises at least one resilient member, the casing further includes at least one positioning rod, the at least one resilient member is located between the top cover and the casing and is sleeved on the at least one positioning rod.

According to an embodiment of the present invention, the pushing member is made of a heat-resistant material.

Accordingly, the present invention is advantageously adapted for:

First of all, because the pushing member pushes the conductive plate which is overheated, extended and deformed under a current overload condition, the pushing member effectively pushes and forces the deformed conductive plate after overheating to trip off completely, the problem that the conductive plate of the conventional safety device does not trip off completely is improved and avoid the circuit connecting and cutting off frequently alternatively, so that the current supplied to an electronic appliance or an electrical appliance is stable and the life of the electronic appliance or the electrical appliance is prolonged.

Furthermore, the problem that the conductive plate of the conventional safety device does not trip off completely is improved and avoid the circuit connecting and cutting off frequently alternatively, the circuit cannot generate spark, high heat and fire, no fire accident would happen.

Moreover, the present invention can overcome the problem that the conductive plates have different temperature threshold values and difficultly control because of different materials and thicknesses by the pushing member, even the conductive plates have different materials and thicknesses, they can still promptly trip off as expected to cut off the circuits smoothly, thereby achieving the purpose of protection of the switches.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 3:
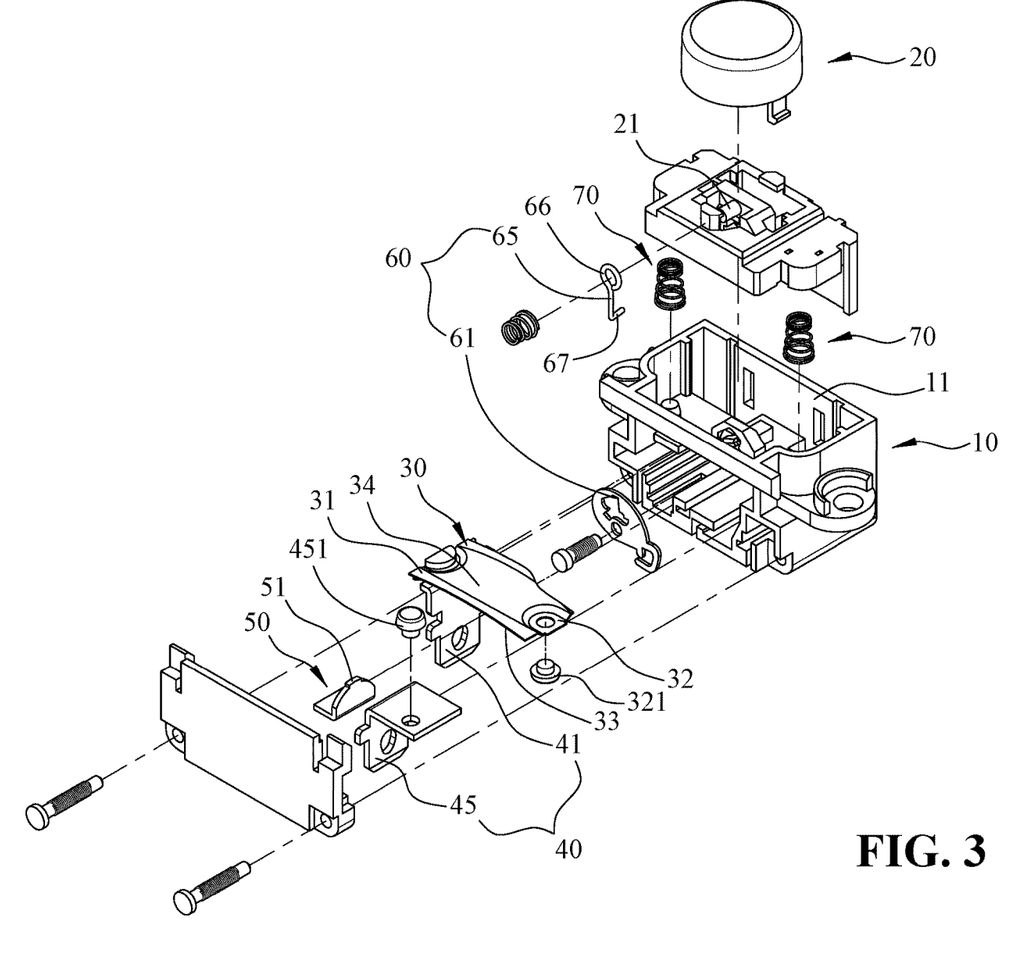
FIG. 3 is an exploded view of a safety device for a switch according to an embodiment of the present invention.

FIG. 3 is an exploded view of a safety device for a switch according to an embodiment of the present invention. Referring to the FIG. 3, the present invention provides a safety device for a switch. The safety device includes a casing 10, a top cover 20, a conductive plate 30, at least two terminals 40, a pushing member 50, and a connection member 60.

The casing 10 has an opening 11.

The top cover 20 is movably disposed at the opening 11 of the casing 10 and includes a shaft 21.

The conductive plate 30 is made of metal, has elasticity and includes a fixed end 31, a free end 32, a first side 33 and a second side 34. The free end 32 of the conductive plate 30 has a first contact point 321. More specifically, the conductive plate 30 is able to bend toward either of the first side 33 and the second side 34. When the conductive plate 30 is overheating, the conductive plate 30 is bent and deformed toward in an opposite direction and bounces toward the other side. In one embodiment of the present invention, the conductive plate 30 is made of alloy.

The at least two terminals 40 defines a first terminal 41 and a second terminal 45 respectively.

The first terminal 41 has a first end and a second end. The first end of the first terminal 41 is in connection with the fixed end 31 of the conductive plate 30. The second end of the first terminal 41 extends out of the casing 10 and is in connection with a first wire (not shown). More specifically, due to the fixed end 31 of the conductive plate 30 is in connection with the first end of the first terminal 41, the free end 32 of the conductive plate 30 can bounce and move up or down by an external force or because conductive plate 30 is bent and deformed.

The second terminal 45 has a first end and a second end. The first end of the second terminal 45 has a second contact point 451 and a position of the second contact point 451 corresponds to a position of the first contact point 321. The second end of the second terminal 45 extends out of the casing 10 and is in connection with a second wire (not shown).

The pushing member 50 is securely installed in the casing 10 and disposed between the first terminal 41 and the second terminal 45 and located close to the first side 33 of the conductive plate 30. The pushing member 50 is substantially perpendicular to the conductive plate 30. In one embodiment of the present invention, the pushing member 50 includes an end portion 51, the end portion 51 is circular arc, and a gap is defined between the end portion 51 and the first side 33 of the conductive plate 30 in such a manner that the end portion 51 of the pushing member 50 and the first side 33 of the conductive plate 30 are not in contact with each other. However, the shape of the end portion 51 of the pushing member 50 is not limited to circular arc, a user can modify the shape of the end portion 51 of the pushing member 50 as his requirement, such as flat or triangle or a protrusion in any shape, and keep the same function. In one embodiment of the present invention, the pushing member 50 is made of a heat-resistant material.

Figure 4:
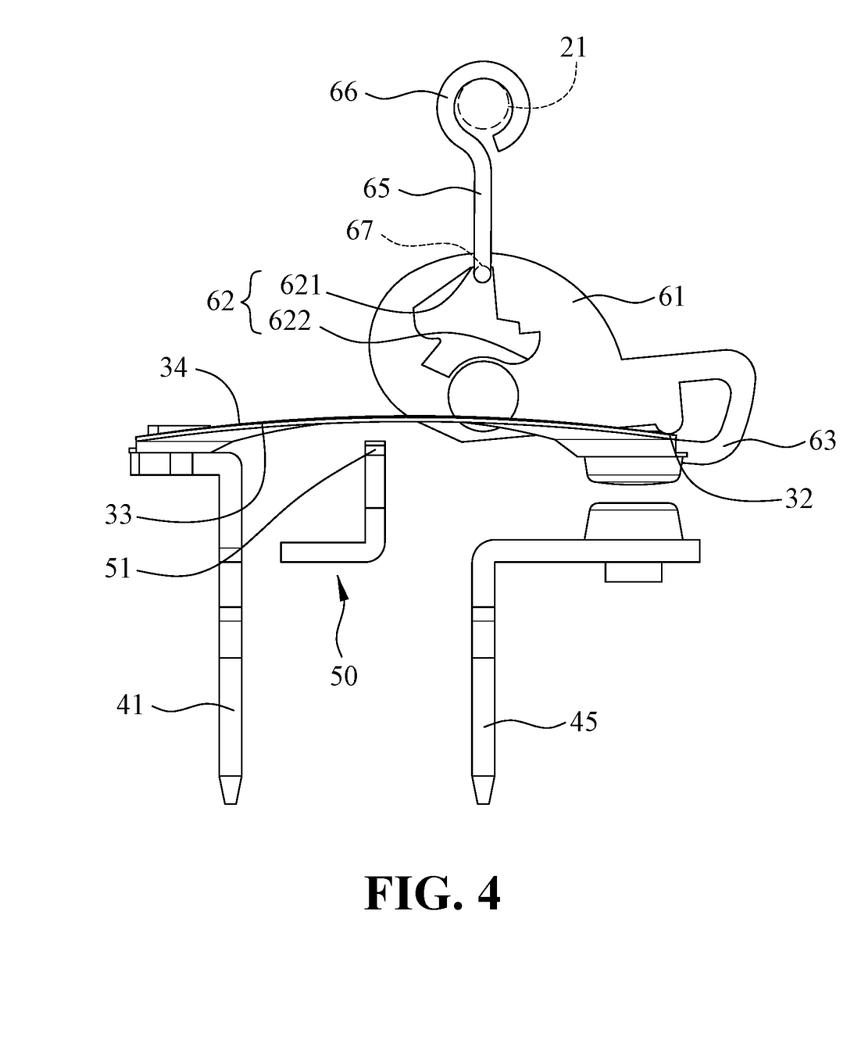
FIG. 4 is a schematic diagram illustrating part of a safety device for a switch according to an embodiment of the present invention.

FIG. 4 is a schematic diagram illustrating part of a safety device for a switch according to an embodiment of the present invention. As shown in FIG. 4, in one preferred embodiment of the present invention, the connection member 60 is in connection with the top cover 20 and the free end 32 of the conductive plate 30. More specifically, the connection member 60 includes a guide rod 65 and a cam 61.

The guide rod 65 has a first end and a second end. The first end of the guide rod 65 is rotatably mounted on the top cover 20. The second end of the guide rod 65 has a pin 67. In one embodiment of the present invention, the first end of the guide rod 65 is formed a ring 66 and the ring 66 of the guide rod 65 is rotatably mounted on the shaft 21 of the top cover 20.

The cam 61 is pivotally mounted on the casing 10 and has a recess 62 and a hook 63. The recess 62 includes a first positioning portion 621 and a second positioning portion 622. A position of the first positioning portion 621 of the recess 62 is close to a top portion of the cam 61. A position of the second positioning portion 622 of the recess 62 is close to the hook 63. The hook 63 hooks the free end 32 of the conductive plate 30. Wherein the pin 67 is movably disposed in the recess 62.

Figure 5:
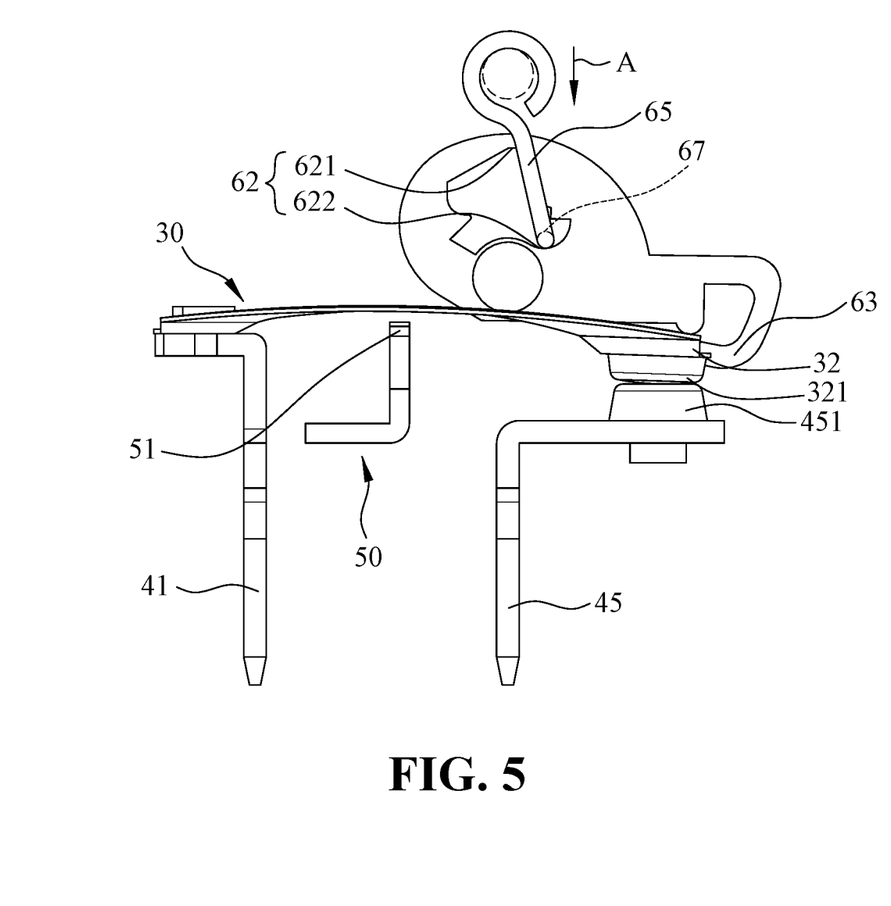
FIG. 5 is a schematic diagram illustrating a circuit in "ON" status of a safety device for a switch according to an embodiment of the present invention.

FIG. 5 is a schematic diagram illustrating a circuit in "ON" status of a safety device for a switch according to an embodiment of the present invention. As shown in FIG. 5, when the top cover 20 is pressed down, the pin 67 of the guide rod 65 moves from the first positioning portion 621 of the recess 62 to the second positioning portion 622 of the recess 62 and pushes the cam 61 to rotate in a direction A, the hook 63 pushes the free end 32 of the conductive plate 30 to move downward in such a manner that the first contact point 321 and the second contact point 451 are in contact with each other. At the moment, a current (not shown) can flow through the first terminal 41, the conductive plate 30, the first contact point 321, the second contact point 451 and the second terminal 45 to form a normal electrical circuit. The current can supply to an electronic appliance (not shown) or an electrical appliance (not shown).

Figure 6:
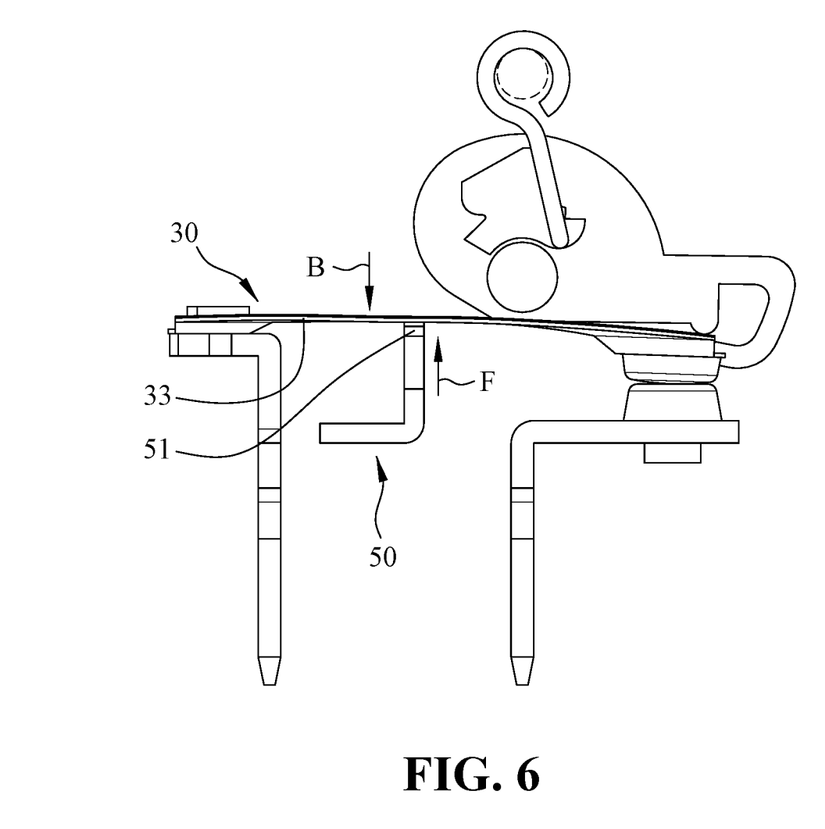
FIG. 6 is a schematic diagram illustrating a safety device for a switch according to an embodiment of the present invention having a conductive plate which is bent and deformed after overheating.

FIG. 6 is a schematic diagram illustrating a safety device for a switch according to an embodiment of the present invention having a conductive plate 30 which is bent and deformed after overheating. As shown in FIG. 6, when the circuit is under a current overload condition or under high ambient temperature condition and the conductive plate 30 is overheating, a middle section of the conductive plate 30 is slightly bent and deformed downward toward the first side 33 of the conductive plate 30. The first side 33 of the middle section of the conductive plate 30 is in contact with the end portion 51 of the pushing member 50, the pushing member 50 applies a reaction force F to the conductive plate 30 in an opposite direction B and pushes the conductive plate 30 to move upward.

Figure 7:
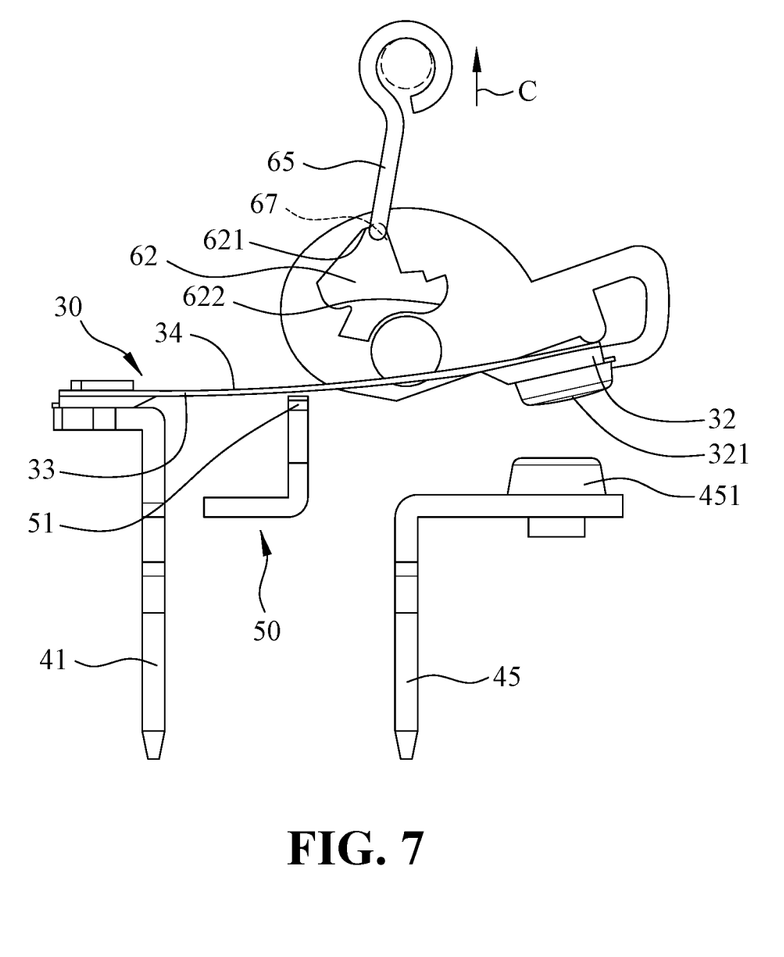
FIG. 7 is a schematic diagram illustrating a circuit in "OFF" status of a safety device for a switch according to an embodiment of the present invention.

FIG. 7 is a schematic diagram illustrating a circuit in "OFF" status of a safety device for a switch according to an embodiment of the present invention. As shown in FIG. 7, the reaction force F forces the free end 32 of the conductive plate 30 to bounce toward the second side 34 of the conductive plate 30 in a direction C in such a manner that the first contact point 321 and the second contact point 451 are separated from each other. The current cannot flow through the first terminal 41, the conductive plate 30, the first contact point 321, the second contact point 451 and the second terminal 45, so that the circuit is cut off. The current cannot supply to an electronic appliance or an electrical appliance. At the moment, the pin 67 of the guide rod 65 moves from the second positioning portion 622 of the recess 62 to the first positioning portion 621 of the recess 62.

It is noted that the first side 33 of the conductive plate 30 contacts and rubs the end portion 51 of the pushing member 50 when the conductive plate 30 is bent and deformed after overheating, the end portion 51 of the pushing member 50 receives high heat from the conductive plate 30. Therefore, once the first side 33 of the conductive plate 30 contacts or rubs the end portion 51 of the pushing member 50 frequently with high heat after a period of time, then the end portion 51 of the pushing member 50 is easily overheating and is melted or worn out. Thus, the gap defined between the end portion 51 and the conductive plate 30 is enlarged, the reaction force F applied by the pushing member 50 to the conductive plate 30 is reduced. Therefore, in order to avoid the end portion 51 of the pushing member 50 is melted or worn out, in one preferred embodiment of the present invention, the pushing member 50 and its end portion 51 are made of a heat-resistant material or a wear-resistant material, such as metal or heat-resistant plastic.

Figure 8:
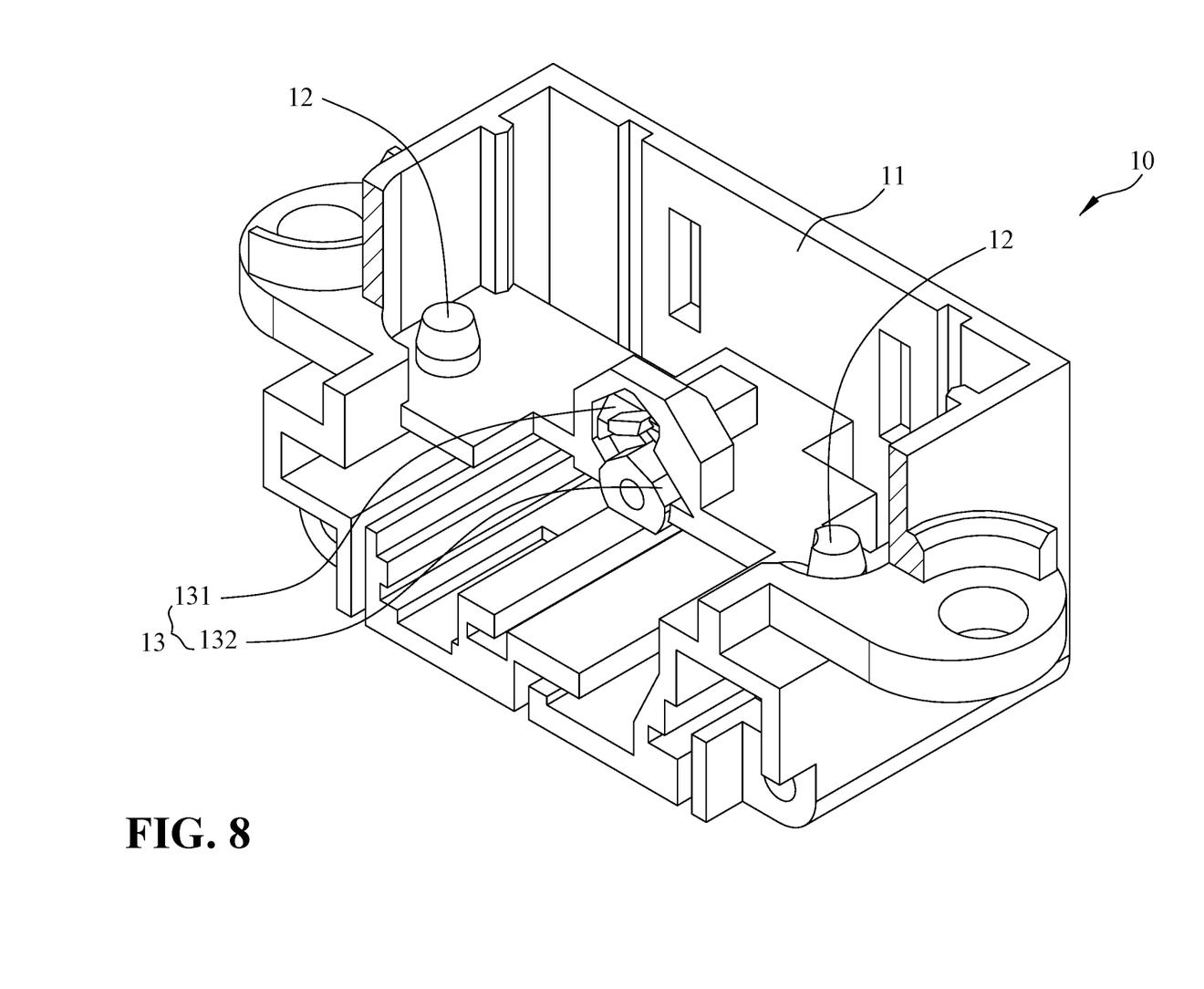
FIG. 8 is a partially cross-sectional perspective view of a casing of a safety device for a switch according to an embodiment of the present invention.

FIG. 8 is a partially cross-sectional perspective view of a casing 10 of a safety device for a switch according to an embodiment of the present invention. As shown in FIG. 8, in one preferred embodiment of the present invention, because the cam 61 is pivotally mounted on the casing 10, in order to ensure the pin 67 can move between the first positioning portion 621 of the recess 62 and the second positioning portion 622 of the recess normally, the casing 10 further includes a path 13, the pin 67 penetrates through the recess 62 and is movably disposed in the path 13. More specifically, the path 13 includes an upper path 131 and a lower path 132. A position of the upper path 131 corresponds to the position of the first positioning portion 621 of the recess 62. A position of the lower path 132 corresponds to the position of the second positioning portion 622 of the recess 62. Therefore, the pin 67 is guided to move between the upper path 131 and the lower path 132 in such a manner that the pin 67 can move between the first positioning portion 621 of the recess 62 and the second positioning portion 622 of the recess 62 normally.

Furthermore, in order to when the conductive plate 30 rebounds, the top cover 20 can rebound to an initial position, in one preferred embodiment of the present invention, the safety device further includes two resilient members 70 and the casing 10 further includes two positioning rods 12. The resilient members 70 are located between the top cover 20 and the casing 10 and are sleeved on the positioning rods 12 respectively. The resilient members 70 provide elastic force to the top cover 20 in such a manner that the top cover 20 can rebound to the initial position. In one preferred embodiment of the present invention, each of the resilient members 70 is spring.

Accordingly, the present invention is advantageously adapted for:

First of all, because the pushing member 50 pushes the conductive plate 30 which is overheated, extended and deformed under a current overload condition, the pushing member 50 effectively pushes and forces the deformed conductive plate 30 after overheating to trip off completely, the problem that the conductive plate 201 of the conventional safety device does not trip off completely is improved and avoid the circuit connecting and cutting off frequently alternatively, so that the current supplied to the electronic appliance or the electrical appliance is stable and the life of the electronic appliance or the electrical appliance is prolonged.

Furthermore, the problem that the conductive plate 201 of the conventional safety device does not trip off completely is improved and avoid the circuit connecting and cutting off frequently alternatively, the circuit cannot generate spark, high heat and fire, no fire accident would happen.

Moreover, the present invention can overcome the problem that the conductive plates 30 have different temperature threshold values and difficultly control because of different materials and thicknesses by the pushing member 50, even the conductive plates 30 have different materials and thicknesses, they can still promptly trip off as expected to cut off the circuits smoothly, thereby achieving the purpose of protection of the switches.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A safety device for a switch, comprising:
a casing having an opening;
a top cover movably disposed at the opening of the casing;
a conductive plate including a fixed end, a free end, a first side and a second side, the free end of the conductive plate having a first contact point;
at least two terminals defining a first terminal and a second terminal respectively, the first terminal having a first end and a second end, the first end of the first terminal in connection with the fixed end of the conductive plate, the second end of the first terminal extending out of the casing and in connection with a first wire, the second terminal having a first end and a second end, the first end of the second terminal having a second contact point, the second contact point corresponding to the first contact point, and the second end of the second terminal extending out of the casing and in connection with a second wire;
a pushing member disposed between the first terminal and the second terminal and including an end portion, a gap defined between the end portion and the first side of the conductive plate; and
a connection member in connection with the top cover and the free end of the conductive plate;
wherein when the top cover is pressed down, the connection member pushes the conductive plate to move downward in such a manner that the first contact point and the second contact point are in contact with each other so as to form a circuit; and
wherein when the circuit is under a current overload condition and the conductive plate is overheating, the conductive plate is bent and deformed toward the first side of the conductive plate, and the first side of the conductive plate is in contact with the end portion of the pushing member, thereby forcing the free end of the conductive plate to bounce toward the second side of the conductive plate in such a manner that the first contact point and the second contact point are separated from each other and the circuit is cut off.

2. The safety device according to claim 1, wherein the connection member includes a cam and a guide rod; wherein the cam is pivotally mounted on the casing and has a recess and a hook, the hook hooks the free end of the conductive plate; and wherein the guide rod has a first end and a second end, the first end of the guide rod is rotatably mounted on the top cover, the second end of the guide rod has a pin, and the pin is movably disposed in the recess.

3. The safety device according to claim 2, wherein the recess includes a first positioning portion and a second positioning portion, a position of the first positioning portion of the recess is close to a top portion of the cam, and a position of the second positioning portion of the recess is close to the hook.

4. The safety device according to claim 3, wherein the casing further includes a path, the pin penetrates through the recess and is movably disposed in the path.

5. The safety device according to claim 4, wherein the path includes an upper path and a lower path, a position of the upper path corresponds to the position of the first positioning portion of the recess and a position of the lower path corresponds to the position of the second positioning portion of the recess.

6. The safety device according to claim 2, wherein the first end of the guide rod is formed a ring, the top cover includes a shaft, and the ring of the guide rod is rotatably mounted on the shaft of the top cover.

7. The safety device according to claim 1, further comprising at least one resilient member, the casing further including at least one positioning rod, the at least one resilient member located between the top cover and the casing and sleeved on the at least one positioning rod.

8. The safety device according to claim 1, wherein the pushing member is made of a heat-resistant material.

* * * * *